June 10, 1952     J. HENRY     2,600,294
BAKING CHAMBER
Filed Feb. 24, 1948     2 SHEETS—SHEET 1
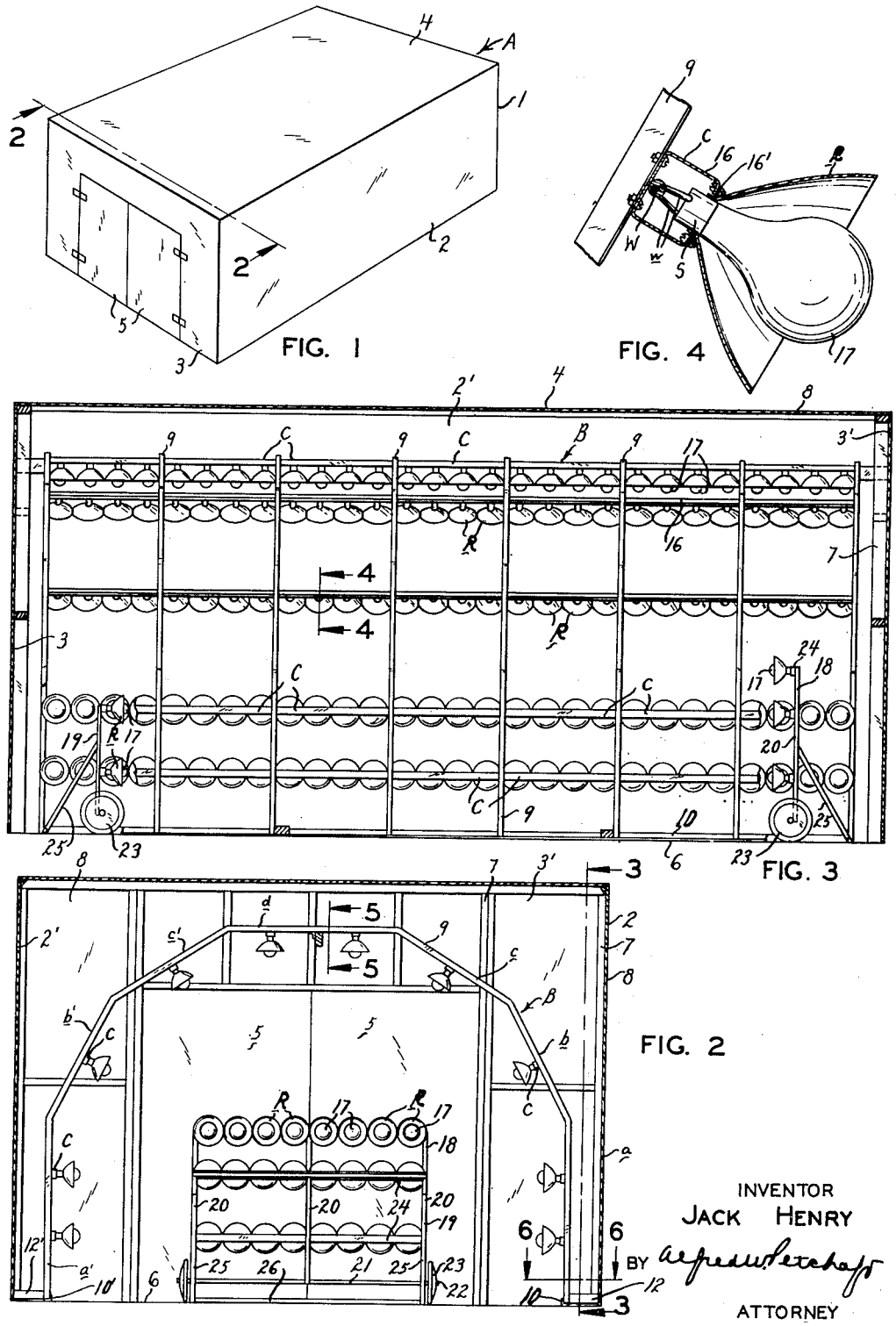
INVENTOR
JACK HENRY
BY
ATTORNEY June 10, 1952     J. HENRY     2,600,294
BAKING CHAMBER Filed Feb. 24, 1948     2 SHEETS—SHEET 2

INVENTOR
JACK HENRY

BY *Alfred W. Fetch Jr.*

ATTORNEY

Patented June 10, 1952

2,600,294

UNITED STATES PATENT OFFICE 2,600,294

BAKING CHAMBER

Jack Henry, Atlanta, Ga., assignor to North American Electric Lamp Co., St. Louis, Mo., a corporation of Missouri Application February 24, 1948, Serial No. 10,489

1 Claim. (Cl. 189—2)

This invention relates in general to ovens and, more particularly, to a chamber for making paint on automobiles, truck bodies, furniture, and other bulky bodies.

The primary object of this invention is to provide a baking chamber for use in baking paint on automobiles which will complete the baking or drying process in an unusually short period of time and in a substantially improved manner.

A further object of this invention is to provide a baking chamber for use in baking paint on automobiles which will accomplish an improved evenness of color and uniformity of hardness throughout the painted surface.

A further object of the present invention is to provide a chamber for baking paint on automobiles which, by novel arrangement, requires substantially less heating units than heretofore utilized.

An additional object of the present invention is to provide a chamber for baking paint on automobiles which requires a minimum amount of space, is of simple and sturdy construction, and is economical in fabrication.

With the above and other objects in view, my invention resides in the novel features of form, construction, arrangement, and combination of parts presently described and pointed out in the claim.

In the accompanying drawings:

Figure 1 is a perspective view of a baking chamber constructed in accordance with and embodying the present invention;

Figure 2 is a transverse sectional view along line 2—2 of Figure 1;

Figure 3 is a transverse sectional view along line 3—3 of Figure 2;

Figure 4 is a transverse sectional view along line 4—4 of Figure 3;

Figure 5:
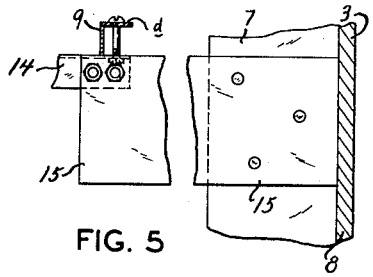
Figure 7:
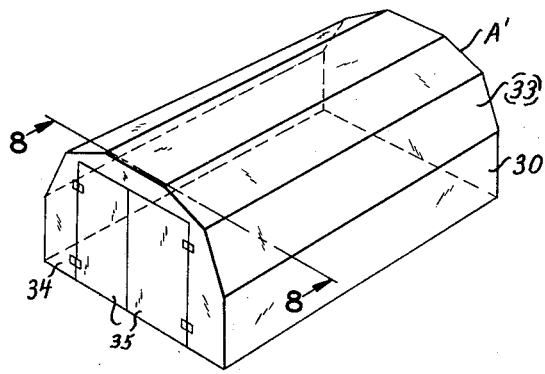
Figure 6:
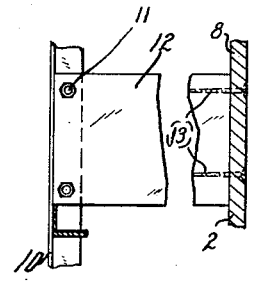
Figure 8:
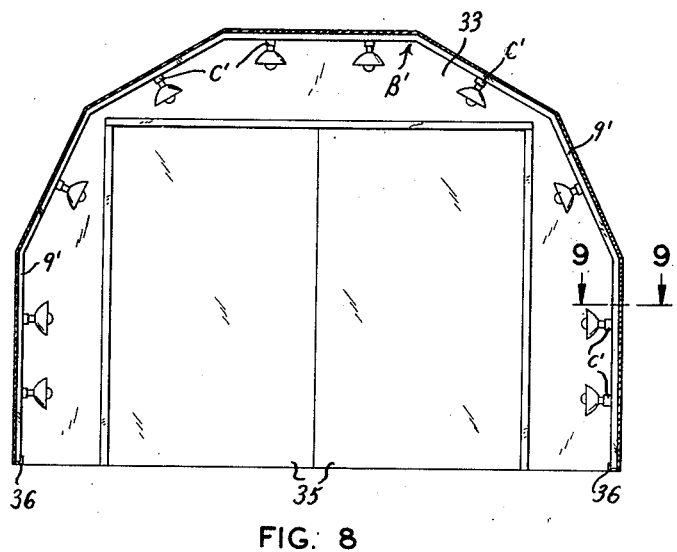

Figures 5 and 6 are transverse sectional views along lines 5—5 and 6—6, respectively, of Figure 2;

Figure 7 is a perspective view of a modified type of baking chamber;

Figure 8 is a transverse sectional view along line 8—8 of Figure 7; and

Figure 9:
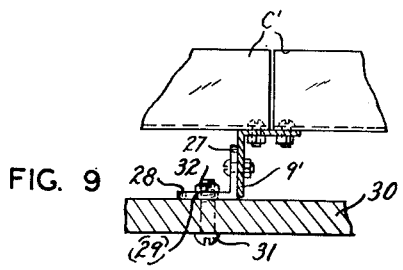

Figure 9 is a transverse sectional view along line 9—9 of Figure 8.

Referring now in more detail, and by reference characters to the drawings, which illustrate practical embodiments of the present invention, A designates a baking chamber comprising a rectangular room-like enclosure 1, which is provided with two side walls 2, 2', two end walls 3, 3', and a top wall 4, at least one of said end walls 3 being provided with a pair of outwardly swinging doors 5. The enclosure 1 is of sufficient dimensions to accommodate an automobile of any size and is designed to be located on a fixed surface of floor 6, as in repair stations or paint shops. Said enclosure 1 is constructed preferably of a skeleton-like wooden framework 7 formed of any suitable material and exteriorly covered with a layer of insulating material 8, such as Celotex or asbestos. If desired, the inner surface of the walls and doors may be covered by reflective material.

Within the enclosure 1 is a metallic framework B comprised of a plurality of parallel arch members 9 spanning substantially the width of the enclosure 1. The legs or lower sections a, a', of said arch members 9 are perpendicular to the floor 6 and parallel to the side walls 2, 2', respectively. The bowed or arch-forming portion of the arch member 9 is of polygonal design containing five sections b, b', c, c', and d, the latter being at the top of the arch and parallel to the floor or fixed surface 6, whereas the sections b and c and b' and c' extend between the sections d and the legs a, a', respectively, and are at obtuse angles to each other and to the sections they adjoin. The arch members 9 are fabricated preferably of angle iron. The desired angularity of the arch members 9 is provided by cutting out a section of the angle iron at the point of bending, bending the iron, and then welding the cut-out portion to provide adequate strength to the member 9. However, if desired, metallic bars or rods of divers cross-section, such as circular, H-shape, or channel shape, may be employed in the construction of the arch members 9.

The lower ends of the legs a, a', of the arch members 9 are welded, or otherwise suitably connected, to unitary base members 10, 10', respectively, fabricated preferably of one inch angle iron, which rests on the floor 6 and extends the full length of the enclosure 1. The base members 10, 10', are secured by bolts 11 to the inner portions of longitudinal wooden blocks 12, 12', respectively, which extend the length of the enclosure 1 between the legs a, a', of the arch members 9 and the side walls 2, 2', respectively. The outer portions of the blocks 12, 12', are secured by screws 13 to the side walls 2, 2', all as may best be seen in Figure 6.

Attached preferably by bolts to sections d of the arch members 9, and extending the length of the enclosure 1 along the center line thereof, is a brace bar 14, also fabricated preferably of angle iron and secured at its ends to wooden blocks 15 suitably attached to the frame-work 7 of the enclosure 1.

Mounted on, and extending the full length of, the frame-work B is a plurality of rows of so-called "strip units" C disposed in end-to-end relation. Each strip unit C comprises a U-shaped conduit channel 16 bolted securely at its ends and extending horizontally between two adjacent arch members 9, serving the dual purpose of binding the arch members 9 into sturdy structure and of carrying a main two-wire electrical conduit W. Mounted closure-wise upon and across the open face of each channel is a coverplate 16' provided at uniformly spaced intervals with conventional electric sockets S which extend therethrough and are electrically connected to the conduit W by wiring w. Fixed upon each socket S is a conical reflector R and screwed or otherwise suitably mounted in each socket S is an infra-red bulb 17. The legs a, a', of the arch members 9 have two spaced parallel rows of strip units C. One row of strip units C is mounted on each of the sections b, b', c, c', and two rows of strip units C are mounted in parallel on section d of said members 9. Each of the rows of strip units C so mounted are perpendicular to their respective sections of the members 9. Conventional leads, junction boxes, and switches (not shown) are provided for on and off control of the bulbs 17.

For movable disposition within the chamber A there are provided portable units 18, 19, each of which contains three spaced upright parallel bars 20 fabricated preferably of angle iron. Said bars 20 are attached, as by welding, at their lower ends to a cross rod 21 having outwardly projecting axle-forming ends 22 on which wheels 23 are rotatably mounted. Welded or otherwise secured to, and extending horizontally between, the bars 20 are strip units, 24, similar in construction to the strip units C. The portable units 18, 19, respectively, are provided with three and two spaced parallel strip units 24. Eight bulbs 17, with reflectors R, are accommodated on each of said strip units 24. Secured, as by welding, at their upper ends to the rear surfaces of the outer two of the three bars 20 are brace members 25, which extend rearwardly and obliquely. The lower ends of said brace members 25 are connected to a transverse rod 26 designed to rest on the floor 6 to hold the units 18, 19, upright in any desired location. When desired or necessary, the units 18, 19, may be tilted slightly forwardly, raising the transverse rod 26 upwardly out of contact with the floor 6 and thereby permitting the units 18, 19, to be freely wheeled about to any selected new location.

In operation, a freshly painted automobile, with the paint still in a wet state, is driven or otherwise moved into the chamber A. The windows of the automobile are rolled into closed position, as it has been discovered that windows in such position are not subject to cracking from infra-red heating. The portable unit 19 is moved into position at the front end of the automobile, so that the bulbs 17 thereon, being directed at said front end of the automobile, are substantially the same distance from the automobile as are the bulbs 17 on the frame-work B. The portable unit 18 is similarly moved into position at the rear end of the automobile. The doors 5 are then closed to maintain the chamber A in a dust-free condition during usage. The infra-red bulbs 17, located on the frame-work B and on the portable units 18, 19, are then turned on. It is to be particularly noted that, by the novel design of the frame-work B, the bulbs 17 mounted thereon are all substantially equidistant from the automobile. This arrangement, in addition to preventing marked heat loss, also assures an evenness of color and uniformity of hardness throughout the painted surface of the automobile. The paint will be completely baked after being subjected to the heat for less than one-half hour.

If desired, a modified form of baking chamber A' may be provided comprising a plurality of spaced parallel arch members 9' transversely secured together by a plurality of spaced parallel rows of strip units C', the arch members 9' and the strip units C' being substantially identical with the previously described arch members 9 and strip units C. Bolted or otherwise suitably secured at suitably spaced intervals adjacent the outer longitudinal margins of the arch members 9' are L-shaped adjustment clips 27 having laterally extending flanges 28, the outer faces of which are substantially flush with the longitudinal margin of the arch member 9' and are each provided with a suitable aperture 29. Mounted externally upon, and extending horizontally between, the arch members 9' are panel-like wall forming elements 30 formed of heavy diathermanous combustion board or similar material and secured in place by means of bolts 31 which extend therethrough and through the apertures 29, each being drawn tightly in place by a nut 32, all as may best be seen in Figure 9. It should be noted that the wall-forming panels or elements 30 are of such width and length as to fit closely together in edgewise relationship to form a complete enclosing outer wall or shell for the chamber A', and the chamber A' is finally completed by securing a back wall element 33 across one end thereof and a front wall element 34 across the other end thereof, the latter being conventionally provided with a suitably sized pair of doors 35. If desired, the lower ends of the arch members 9' may be welded to transversely extending angle iron sections 36 which serve both to tie the lower ends of the arch members 9' transversely together and to distribute the floor load of the structure more evenly over the floor or other supporting surface upon which it is erected.

It should be understood that changes and modifications in the form, construction, arrangement, and combination of the several parts of the baking chamber may be made and substituted for those herein shown and described without departing from the nature and principle of the present invention.

Having thus described my invention, what I now claim and desire to secure by Letters Patent is:

A plurality of arch-forming members having L-shaped cross-sectional contour with a flat flange disposed inwardly and an edgewise presented leg-forming flange extending outwardly from said flat flange, a plurality of strip units secured at their ends to and extending horizontally between the flat flanges thereby serving as structural connections between the arch-forming members, a plurality of L-shaped clips secured to the leg-forming flanges and having flat outwardly presented faces disposed outwardly from the outwardly presented edges of the leg-forming flanges, and imperforate wall-forming panels secured to and extending between said clips for completing an enclosure around the arch-forming members in which enclosure the inwardly presented faces of the walls are spaced outwardly from the flat flanges to which the strip units are secured so as to provide for free circulation of air behind the strip units and against the edgewise presented leg-forming flanges.

JACK HENRY.

REFERENCES CITED

The following references are of record in the file of this patent:

UNITED STATES PATENTS

| Number | Name | Date |
|---|---|---|
| 2,057,776 | Groven | Oct. 20, 1936 |
| 2,221,351 | Kempf | Nov. 12, 1940 |
| 2,405,631 | Attwood | Aug. 13, 1946 |
| 2,418,283 | Wilson | Apr. 1, 1947 |
| 2,419,643 | Hudson | Apr. 29, 1947 |
| 2,439,005 | Jensen | Apr. 6, 1948 |
| 2,478,001 | Miskella | Aug. 2, 1949 |
| 2,521,232 | Lashells | Sept. 5, 1950 |

OTHER REFERENCES

Conserve for Victory with Near Infrared, The Fostoria Pressed Steel Corporation, Fostoria, Ohio, 12 pages.

Nalco Dritherm Infra-Red Ray Carbon Lamps, "Drying Process Made Easy," North American Electric Lamp Co., 1014 Tyler St., St. Louis, Mo., 8 pages.

The Rewards of Industrial Efficiency, The Fostoria Pressed Steel Corporation, Fostoria, Ohio, 12 pages.

Infra-Red in Industry, Wm. J. Miskella, 1947, pages 8–12, 34 and 35.

Industrial and Engineering Chemistry, February 1941, vol. 33, No. 2, pages 226–229.